United States Patent
Roepke et al.

(10) Patent No.: US 7,021,823 B2
(45) Date of Patent: Apr. 4, 2006

(54) TEMPERATURE MEASURING ARRANGEMENTS IN A BATTERY PACK FOR A HAND-HELD TOOL

(75) Inventors: Stefan Roepke, Leinfelden (DE); Rainer Glauning, Aichtal-Groetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/400,965

(22) Filed: Mar. 27, 2003

(65) Prior Publication Data
US 2003/0185278 A1    Oct. 2, 2003

(30) Foreign Application Priority Data
Mar. 30, 2002  (DE)  ............... 102 14 366

(51) Int. Cl.
*G01K 1/08* (2006.01)
*H01M 10/48* (2006.01)

(52) U.S. Cl. ............... 374/152; 374/183; 374/208; 429/120; 429/90; 320/150

(58) Field of Classification Search ............... 374/152, 374/165, 183, 185, 208; 429/90, 120; 320/150
See application file for complete search history.

(56) References Cited

U.S. PATENT DOCUMENTS

| | | | | | |
|---|---|---|---|---|---|
| 3,537,907 | A | * | 11/1970 | Wilson | 429/120 |
| 4,314,008 | A | * | 2/1982 | Blake | 429/120 |
| 4,848,923 | A | * | 7/1989 | Ziegler et al. | 340/870.17 |
| 5,245,269 | A | * | 9/1993 | Tooley et al. | 320/150 |
| 5,449,571 | A | * | 9/1995 | Longardner et al. | 429/120 |
| 5,480,734 | A | * | 1/1996 | Schulz et al. | 320/150 |
| 5,482,793 | A | * | 1/1996 | Burns et al. | 320/150 |
| 5,508,126 | A | * | 4/1996 | Braun | 429/120 |
| 5,522,663 | A | * | 6/1996 | Fichter et al. | 374/208 |
| 5,592,065 | A | * | 1/1997 | Oglesbee et al. | 320/150 |
| 5,645,949 | A | * | 7/1997 | Young | 320/150 |
| 5,680,030 | A | * | 10/1997 | Kadouchi et al. | 429/90 |
| 5,767,659 | A | * | 6/1998 | Farley | 320/150 |
| 5,795,664 | A | * | 8/1998 | Kelly | 320/150 |
| 5,962,157 | A | | 10/1999 | Kang | |
| 6,057,050 | A | * | 5/2000 | Parise | 429/120 |
| 6,152,597 | A | * | 11/2000 | Potega | 429/90 |
| 6,296,966 | B1 | * | 10/2001 | Verhoog et al. | 429/90 |
| 6,692,864 | B1 | * | 2/2004 | Dansui et al. | 429/120 |
| 6,771,050 | B1 | * | 8/2004 | Yamashita | 320/150 |
| 6,811,921 | B1 | * | 11/2004 | Dansui et al. | 429/99 |
| 6,841,291 | B1 | * | 1/2005 | Minamiura | 429/90 |
| 2003/0186114 | A1 | * | 10/2003 | Lohr et al. | 429/120 |

FOREIGN PATENT DOCUMENTS

| | | | |
|---|---|---|---|
| DE | 40 17 475 A1 | | 12/1991 |
| DE | 4400461 C1 | * | 1/1995 |
| GB | 2145229 A | * | 3/1985 |
| JP | 2002124305 A | * | 4/2002 |
| WO | 01/22107 A1 | | 3/2001 |
| WO | WO 200163681 A1 | * | 8/2001 |

\* cited by examiner

*Primary Examiner*—Gail Verbitsky
*Assistant Examiner*—Stanley J. Pruchnic, Jr.
(74) *Attorney, Agent, or Firm*—Michael J. Striker

(57) ABSTRACT

A measuring arrangement, in particular, for temperature measurement in an accumulator pack, with at least one cell (10) for storage of electrical energy, at least one cooling body (12) thermally connected with the cell (10) for cooling the cell (10), and at least one temperature sensor (14). The temperature sensor (14) is thermally connected with the cooling body (12).

14 Claims, 4 Drawing Sheets

_US 7,021,823 B2_

TEMPERATURE MEASURING ARRANGEMENTS IN A BATTERY PACK FOR A HAND-HELD TOOL

The present application is related to application U.S. Ser. No. 10/401,160, filed Mar. 27, 2003 (now pending), which contains subject matter that is different from, but related to, the subject matter of the instant application.

BACKGROUND OF THE INVENTION

The present invention relates to a measuring arrangement, in particular, for temperature measurement in an accumulator pack for a hand-held machining tool.

With modern hand-held machining tools, the supply of current often takes place by chargeable accumulator packs, which advantageously make possible network-independent, mobile operation. These types of accumulator packs comprise multiple electrically interconnected cells, which store electrical energy, whereby these cells are intensely heated during discharging during normal operation, as well as during charging, which, in extreme case, can lead to damage to the accumulator pack. Therefore, it is known to measure the temperature of an accumulator pack, in order to prevent this type of thermal overload. In this connection, a temperature sensor, such as, for example, a so-called NTC (Negative Temperature Coefficient), is attached to an individual cell, which previously was freed from its paper insulation, by means of a heat-conducting adhesive band, in order to achieve a good thermal binding. Upon exceeding a specified maximum temperature, then, in the simplest case, the operation or the charging process can be interrupted, in order to prevent overheating.

It is also known to cool the cells of the accumulator pack by means of a cooling body, in order to counteract overheating, whereby the cooling body is thermally connected with the individual cells in the common manner and is made of a material with a large thermal conductivity, in order to allow the heat from energy loss in the cells during the discharge or charging process to be carried away well.

SUMMARY OF THE INVENTION

In contrast, the present invention encompasses the technical teachings of thermally connecting the temperature sensor with the cooling body, so that the inventive measuring arrangement detects the temperature of the cooling body.

Advantageously to this measuring principle is the high accuracy of the temperature measurement, since, indirectly, the temperature of multiple cells is taken into consideration, whereby local temperature differences are compensated.

In addition, the thermal contact of the cooling body is essentially simpler than the thermal contacting of an individual cell, which must be freed in advance from its paper insulation.

The thermal binding of the temperature sensor to the cooling body can directly take place, in which the temperature sensor contacts the cooling body.

It is also possible, however, in the frame of the present invention that the thermal binding of the temperature sensor to the cooling body takes place indirectly, wherein between the temperature sensor and the cooling body, a heat-conducting element is arranged, which on one side, contacts the cooling body and on the other side, contacts the temperature sensor.

The heat-conducting element can be made of heat-conducting paste, heat-conducting rubber, heat-conducting adhesive, heat-conducting aerated plastic or foam, or a combination of these materials, for example.

Furthermore, in the frame of the invention it is also theoretically possible that the temperature sensor measures the temperature of the cooling body without contact, in which, for example, a radiation sensor is used, which detects the heat radiation being emitted from the cooling body.

In a preferred embodiment of the invention, the temperature sensor is arranged directly on a circuit board, so that additional lines for electrical contact of the temperature sensor are not required. The circuit board is then arranged in operation so that the temperature sensor directly or indirectly contacts the cooling body in the previously described manner.

In another variation of the invention, the temperature sensor, however, is connected with a separate evaluation unit by means of an electrical line or a photoconductor. This offers the advantage of large, constructive design leeway with the positioning of the temperature sensor, since no consideration must be given to the spatial arrangement of the evaluation unit.

A further variation of the invention contemplates that the temperature sensor is connected by means of a wireless transmission connection with the evaluation unit, in order to transmit the measured temperature. For example, a radio connection, an optical communication connection, an acoustic communication connection, or a communication connection based on pressure changes can be used, for example.

The wireless transmission of the measure temperature is particularly advantageous in one variation of the invention, in which the temperature sensor is encapsulated in the cooling body or is countersunk in the cooling body.

One variation of the invention contemplates further multiple temperature sensors, which are thermally connected with the cooling body at different points. This offers the advantage that local temperature oscillations within the cooling body can be taken into consideration with the evaluation of the measurement results.

Moreover, in one variation of the invention, for improving the thermal connection between the temperature sensor and the cooling body, it is provided that the cooling body has a mounting for the temperature sensor. The mounting, for example, can be in a recess or depression in the cooling body, whose inner shape is adapted to the outer shape of the temperature sensor, such that the temperature sensor can be sufficiently introduced into the mounting. In this manner, the effective contact surface between the temperature sensor and the cooling body is increased and the heat transfer resistance is reduced.

Preferably, the mounting reaches a depth in the cooling body, in which the temperature of the cooling body is essentially greater than on the upper surface of the cooling body. This offers the advantage that the temperature sensor effectively measures the core temperature of the accumulator pack, which is essentially greater than the upper surface temperature. The mounting in the cooling body, therefore, preferably reaches such a depth, in which the temperature difference to the maximum temperature within the cooling body is smaller than 10% of the maximum temperature difference within the cooling body.

In a preferred embodiment of the invention, as previously mentioned, multiple cells are provided, whereby the individual cells are thermally connected with the cooling body. This offers the previously mentioned advantage that temperature differences between the individual cells can be equalized upon the evaluation of the measurement results. In addition, the cooling body serves not only for cooling the individual cells, but also for balancing the temperature levels of the individual cells, in which temperature differences between the individual cells are equalized. Therefore, hotter cells convey a part of their heat energy to colder cells via the cooling body, whereby local temperature peaks are evened out.

Preferably, the temperature sensor operates as a temperature-dependent resistance, such as, for example, a PTC (Positive Temperature Coefficient) or an NTC (Negative Temperature Coefficient); however, the invention is also realizable with other types of temperature sensors.

Finally, the present invention includes also a hand-held machining tool with a measuring arrangement according to the present invention, for example, a hand drill, an accumulator worm or screw, or a hand-held grinding apparatus.

BRIEF DESCRIPTION OF THE DRAWINGS

Further advantages are provided in the following description of the drawing. In the drawing, one embodiment of the invention is illustrated. The drawing, the description, and the claims contain a multitude of features in combination. The practitioner also is to recognize individual features and to combine them in further, practical combinations.

DETAILED DESCRIPTION OF THE PREFERRED EMBODIMENTS

Figure 1:
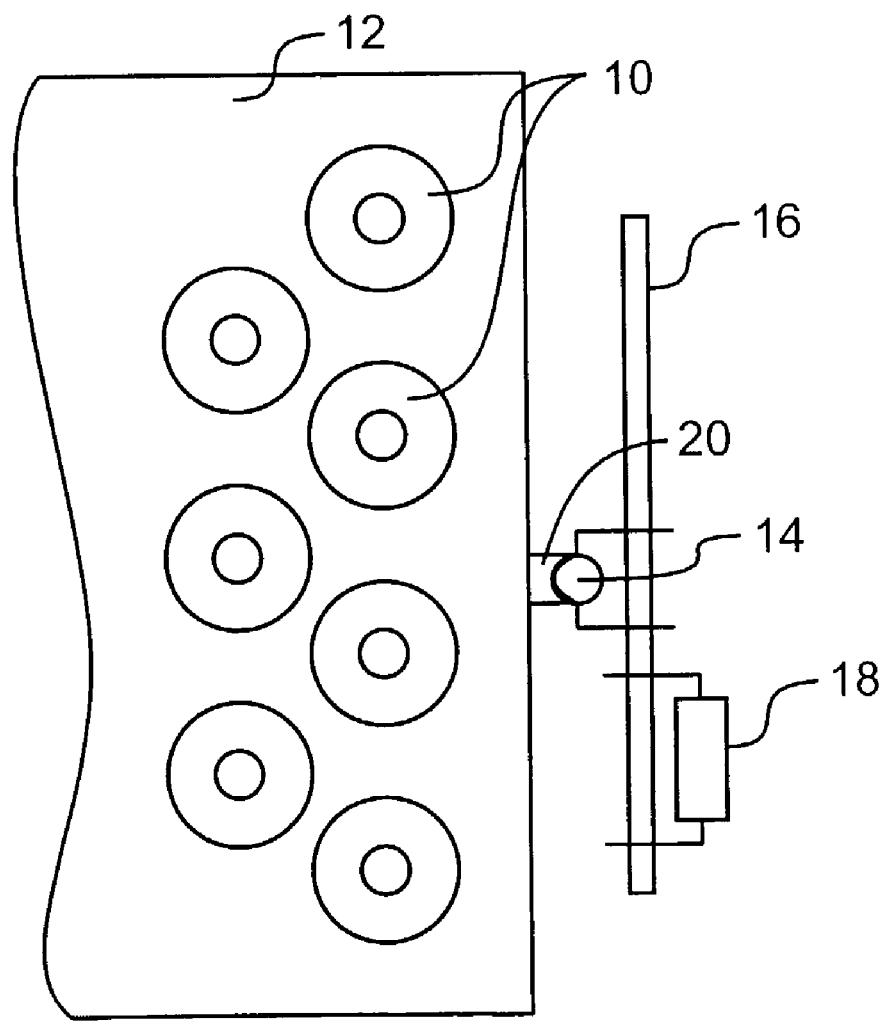
FIG. 1 shows a measuring arrangement according to the present invention with a temperature sensor.

The embodiment of the measuring arrangement of the present invention illustrated in FIG. 1 serves for temperature measurement in an accumulator pack for a hand-held machining tool, whereby the hand-held machining tool can be a hand drill or an accumulator worm or screw, for example.

The accumulator pack therefore has multiple rechargeable cells 10 for storage of electrical energy, whereby the cells 10 are electrically interconnected, with which the accumulator pack prepares the desired electrical voltage and capacitance.

The cells 10 are arranged in a cooling body 12 made of aluminum, which fulfills multiple functions, such as those described below.

First, the cooling body serves for mechanical attachment of the cells 10. In this connection, the cooling body 12 has multiple cylindrical bores, in which the cells 10 are inserted, so that the cells 10 contact the cooling body 12 on its entire cover surface.

In addition, the cooling body 12 has the object of cooling the cells 10 during the charging or discharging process, in order to prevent overheating of the cells 10 by the existing heat from energy loss in the cells 10. The cooling body 12 therefore has a relatively large upper surface and a good heat conductivity, so that the heat from energy loss in the cells 10 is lead to the upper surface of the cooling body and is there dispensed by means of convection. The large contact surface between the cells 10 and the cooling body 12 advantageously leads to a smaller heat transfer resistance between the cells 10 and the cooling body 12, whereby a better heat transfer from the cells 10 to the cooling body 12 is permitted.

Further, the cooling body 12 has the object of equalizing temperature differences between the individual cells 10, in which the cooling body 12 disperses heat energy from the hotter cells to the colder cells. In this manner, local temperature differences within the accumulator pack are equalized, which likewise, counteracts overheating.

Finally, the cooling body 12 serves itself as a heat sensor, in which the cooling body absorbs heat energy from the cells 10. This mechanism is particularly important then when the cells 10, respectively, only are charged for a short time, since the duration of charge is not sufficient to heat the upper surface of the cooling body 12 to the point that the cooling body 12 can emit an appreciable amount of heat energy into the surrounding environment. The heat capacitance of the cooling body 12 therefore is only so large that the heat from energy loss produced by the cells 10, upon a brief charging, only leads to a minimal heating of the cooling body.

Furthermore, the inventive measuring arrangement has a temperature sensor 14, which comprises a temperature-dependent resistance and which is arranged on a circuit board, whereby the temperature sensor 14 is located on the side of the circuit board facing the cooling body 12. In this embodiment, the temperature sensor 14 has a negative dependence on the temperature and is therefore also designated as NTC (Negative Temperature Coefficient). A measurement switch is arranged in the circuit board 16 near the temperature sensor 14, whereby for reasons of simplicity, only one component 18 of the measuring switch is schematically represented.

The circuit board 16 is arranged, such that the temperature sensor 14 in the completely mounted state is located near the upper surface of the cooling body 12. Between the temperature sensor 14 and the upper surface of the cooling body 12, a heat-conducting element 20 is located, which is made of a heat-conducting, elastic rubber and contacts the cooling body 12 on one side and the temperature sensor 14 on the other side.

The elastic heat-conducting element 20 makes possible an equalization of manufacturing-related oscillations of the distance between the temperature sensor 14 and the cooling body 12, so that the manufacture and assembly can take place cost effectively with relative large tolerances.

In addition, the heat-conducting element 20 adapts to unevenness in the upper surface of the temperature sensor 14 or the cooling body 12, based on its elasticity, whereby the effective contact surface is increased and the heat transfer resistance is reduced.

In this embodiment, then, the temperature sensor 14 measures the temperature of the cooling body 12, which reproduces relative accurately the temperature of the accumulator pack. It is particularly advantageous that upon the measurement of the temperature, all of the cells 10 are taken into consideration.

Figure 2:
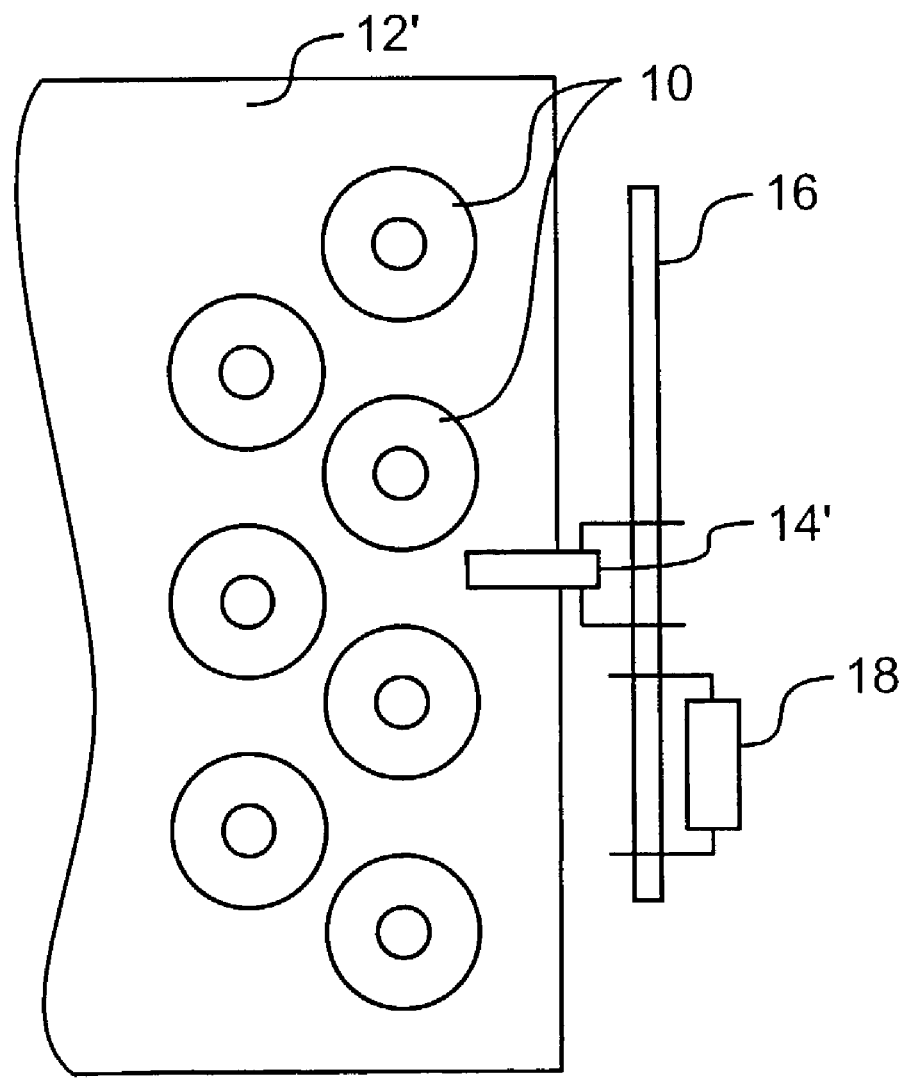
FIG. 2 shows an alternative embodiment of a measuring arrangement of the present invention with a cooling body with a mounting for a temperature sensor.

The embodiment illustrated in FIG. 2 agrees substantially with the previously described embodiment shown in FIG. 1, so that in the description to follow, the same reference numerals will be used for like elements and to avoid repetition, substantial reference is made to the previous description of FIG. 1.

The characteristic of this embodiment is that a cooling body 12' is provided, which has a mounting for a temperature sensor 14'. The mounting hereby comprises a cylindrical bore in the upper surface of the cooling body 12', whereby the interior diameter of the bore is adapted to the outer diameter of the likewise cylindrical temperature sensor 14', so that the temperature sensor 14' can be sufficiently guided into the mounting.

The mounting is therefore partially filled with heat-conducting paste before insertion of the temperature sensor 14', so that in the mounted state, a heat contact between the temperature sensor 14' and the cooling body 12' occurs.

An advantageous feature of this arrangement is that a good heat contact between the temperature sensor 14' and the cooling body 12' is provided, since the contact surface is relatively large.

In addition, the temperature sensor 14' does not detect the upper surface temperature of the cooling body 12, rather its core temperature, which essentially reproduces the temperature of the cells 10 better.

Figure 3:
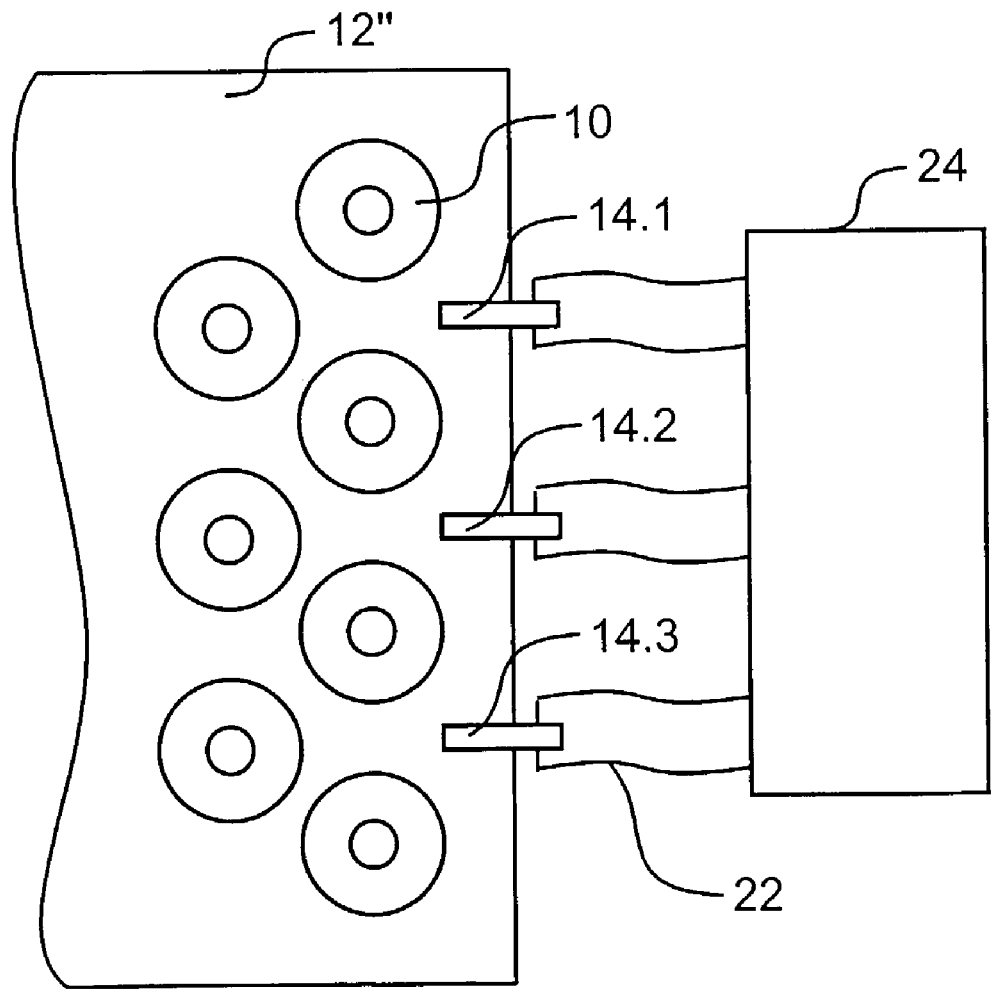
FIG. 3 shows a further embodiment of a measuring arrangement of the present invention with multiple temperature sensors.

The embodiment illustrated in FIG. 3 agrees substantially with the previously described embodiment shown in FIG. 2, so that in the description to follow, the same reference numerals will be used for like elements and to avoid repetition, substantial reference is made to the previous description of FIG. 2.

The characteristic of this embodiment is that multiple temperature sensors 14.1–14.3 are provided, which are introduced into corresponding mountings on the cooling body 12". The individual temperature sensors 14.1–14.3 are arranged at different points on the cooling body 12", so that local temperature peaks within the cooling body 12" can be taken into consideration.

A further difference of this embodiment relative to the previously described embodiments is that the temperature sensors 14.1–14.3, respectively, are connected with an evaluation unit 24 by means of flexible lines 22. As previously mentioned, the flexible fines 22 can be in the form of either an electrical line or a photoconductor. This offers the advantage of large design leeway with the arrangement of the evaluation unit 24.

Figure 4:
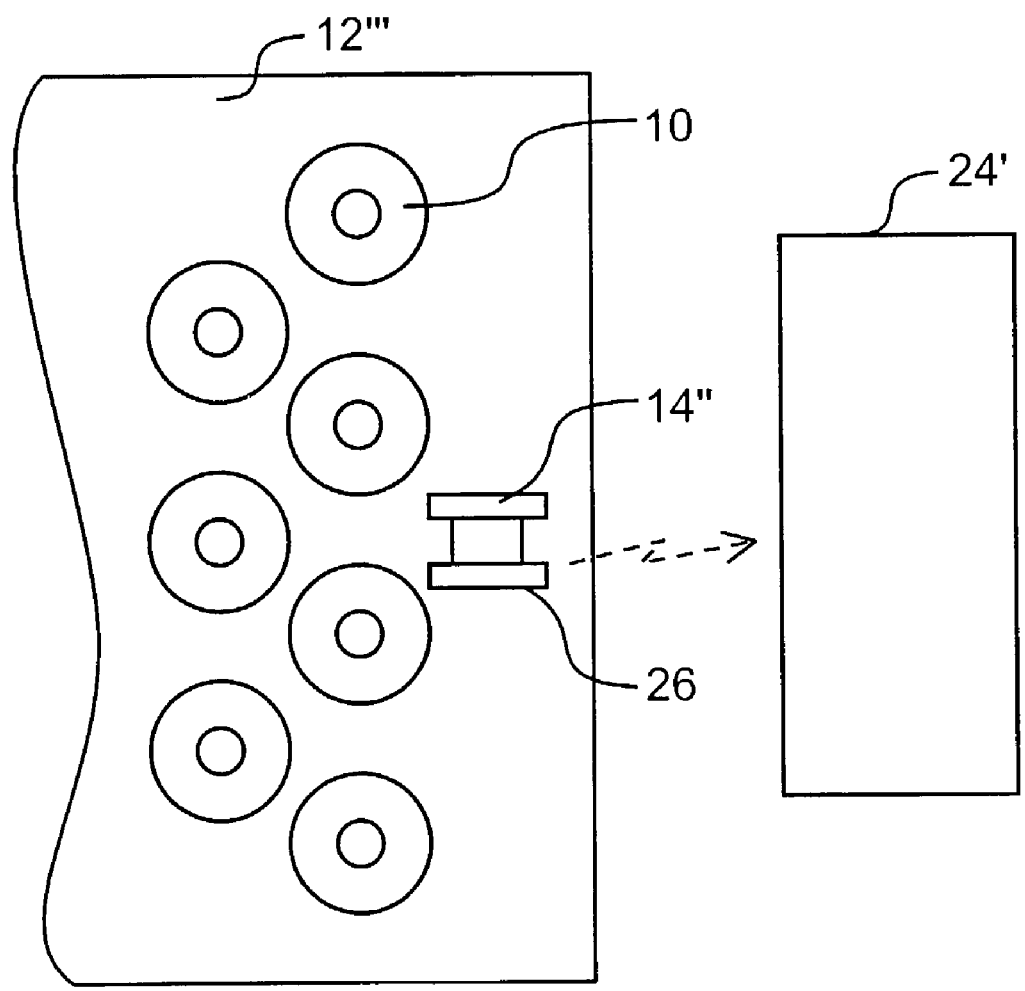
FIG. 4 shows a measuring arrangement of the present invention with a wireless temperature measurement.

Finally, the embodiment illustrated in FIG. 4 also agrees substantially with the previously described embodiments shown in FIGS. 1 to 3, so that ancillary reference is made to the previous description.

Multiple cells 10 are arranged within a cooling body 12", whereby the cooling body 12" prevents overheating of the cells 10, as already previously described.

For measurement of the temperature, a temperature sensor 14" is encapsulated in the cooling body 12''', whereby the temperature sensor 14" is connected with a radio transmitter 26, which transmits the radio signal the produces the measured temperature to an external evaluation unit 24'.

It will be understood that each of the elements described above, or two or more together, may also find a useful application in other types of constructions differing from the types described above.

While the invention has been illustrated and described herein as a measuring arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A measuring arrangement for temperature measurement in an accumulator pack, comprising:
   at least one cell (10) for storage of electrical energy;
   at least one cooling body (12, 12', 12", 12''') thermally connected with the cell (10) for cooling the cell (10); and
   at least one temperature sensor (14, 14', 14.1–14.3, 14"), wherein the temperature sensor (14, 14', 14.1–14.3, 14") is directly arranged on a circuit board and is thermally connected with the cooling body (12, 12', 12", 12''') by means of a heat-conducting element which is arranged between the temperature sensor and the cooling body, wherein the cooling body has a mounting in which the temperature sensor is insertable, and the heat-conducting element and the temperature sensor being inserted in the mounting, whereas the circuit board is arranged completely outside the mounting and remotely from the mounting, and wherein the heat conducting element is made of a material selected from the group consisting of heat-conducting paste, heat-conducting rubber, heat-conductive adhesive, and heat-conducting aerated plastic.

2. The measuring arrangement according to claim 1, wherein the temperature sensor (14.1–14.3) is connected with an evaluation unit (24) by means of an electrical line (22) or a photoconductor.

3. The measuring arrangement according to claim 1, wherein the temperature sensor (14") is connected with an evaluation unit (24) by means of a wireless connection.

4. The measuring arrangement according to claim 3, wherein the wireless connection is a radio connection, an optical connection, an acoustic connection, or a connection based on pressure changes.

5. The measuring arrangement according to claim 1, wherein a plurality of temperature sensors (14.1–14.3) are connected with the cooling body (12") at different points.

6. The measuring arrangement according to claim 1, wherein the cooling body (12', 12") has a mounting for a temperature sensor (14', 14.1–14.3).

7. The measuring arrangement according to claim 6, wherein the mounting extends into the interior of the cooling body (12', 12") at a depth in which the temperature of the cooling body (12', 12") is essentially greater than the temperature of the upper surface of the cooling body (12', 12").

8. The measuring arrangement according to claim 1, wherein a plurality of cells (10) for storage of electrical energy are provided, wherein the individual cells (10) are thermally connected with the cooling body (12, 12', 12").

9. The measuring arrangement according to claim 1, wherein the temperature sensor (14, 14', 14.1–14.3, 14") is a temperature-dependent resistance.

10. A hand-held machining tool with a measuring arrangement as defined in claim 1.

11. The measuring arrangement according to claim 1, wherein the cooling body (12) has multiple cylindrical bores, wherein multiple cylindrical cells are inserted in the multiple cylindrical bores, so that the cells (10) contact the cooling body (12) on an entire cover surface.

12. The measuring arrangement according to claim 1, wherein the heat-conductive element (20) is an elastic heat-conductive element (20).

13. The measuring arrangement according to claim 1, wherein the cooling body (12') comprises a mounting with a cylindrical bore with an inner diameter, wherein said inner diameter is adapted to an outer diameter of the temperature sensor (14'), wherein the mounting is partially filled with heat-conducting paste before insertion of the temperature sensor (14'), so that in the mounted state, a heat contact between the temperature sensor (14') and the cooling body (12') occurs.

14. The measuring arrangement according to claim 1, wherein the cooling body (12) has a mounting for the temperature sensor (14), the mounting in the cooling body (12) reaching a depth at which the temperature difference relative to a maximum temperature within the cooling body is less than 10% of a maximum temperature difference within the cooling body.

* * * * *